US008543925B2

(12) United States Patent
Weitz et al.

(10) Patent No.: US 8,543,925 B2
(45) Date of Patent: Sep. 24, 2013

(54) CONTEXTUALLY AWARE CLIENT APPLICATION

(75) Inventors: Stefan D. Weitz, Seattle, WA (US); Michael J. Miles, Duvall, WA (US); Paul J. Roy, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 1056 days.

(21) Appl. No.: 11/754,105

(22) Filed: May 25, 2007

(65) Prior Publication Data
US 2008/0294997 A1 Nov. 27, 2008

(51) Int. Cl.
*G06F 3/00* (2006.01)

(52) U.S. Cl.
USPC .......................................... 715/742; 715/779

(58) Field of Classification Search
USPC ................................. 715/742, 779
See application file for complete search history.

(56) References Cited

U.S. PATENT DOCUMENTS

| | | | |
|---|---|---|---|
| 5,848,396 | A | 12/1998 | Gerace |
| 7,370,364 | B2 * | 5/2008 | Dobbins et al. ............... 726/28 |
| 2002/0066033 | A1 * | 5/2002 | Dobbins et al. ............. 713/201 |
| 2002/0083010 | A1 * | 6/2002 | Kim ................................. 705/64 |
| 2002/0191572 | A1 | 12/2002 | Weinstein et al. |
| 2005/0273841 | A1 * | 12/2005 | Freund ............................... 726/1 |
| 2006/0059043 | A1 * | 3/2006 | Chan et al. ..................... 705/14 |
| 2006/0059044 | A1 * | 3/2006 | Chan et al. ..................... 705/14 |
| 2006/0074769 | A1 | 4/2006 | Looney et al. |
| 2006/0212350 | A1 | 9/2006 | Ellis et al. |
| 2007/0050253 | A1 | 3/2007 | Biggs et al. |
| 2007/0199044 | A1 * | 8/2007 | Hughes ............................... 726/1 |
| 2007/0233860 | A1 * | 10/2007 | Lillie et al. ..................... 709/225 |
| 2008/0052512 | A1 * | 2/2008 | Stevens et al. ................ 713/168 |
| 2008/0059315 | A1 * | 3/2008 | Karaoguz et al. ............... 705/14 |
| 2009/0313318 | A1 * | 12/2009 | Dye et al. ..................... 709/202 |
| 2010/0049605 | A1 * | 2/2010 | Kim et al. ................. 705/14.52 |

FOREIGN PATENT DOCUMENTS

| | | |
|---|---|---|
| EP | 1320214 | 6/2003 |
| WO | WO2006076424 | 7/2006 |

OTHER PUBLICATIONS

PCT Search Report for PCT Application No. PCT/US2008/062821, mailed Aug. 27, 2008 (10 pages).
Translated the Chinese Office Action mailed Apr. 4, 2011 for Chinese Patent Application No. 200880017349.9, a countepart foreign application of U.S. Appl. No. 11/754,105.
The Extended European Search Report mailed Jul. 6, 2011 for European patent application No. 08769304.0.
The Chinese Office Action mailed Jun. 5, 2012 for Chinese patent application No. 200880017349.9, a counterpart foreign application of U.S. Appl. No. 111754,105, 6 pages.

(Continued)

*Primary Examiner* — Ryan Pitaro
(74) *Attorney, Agent, or Firm* — Lee & Hayes, PLLC (57) ABSTRACT

Techniques and processes for subsidizing network access via content and advertising revenue are described. In one implementation, a user installs a context bar tool on the user's computing device. To access a network (e.g., a wireless network), the user activates the context bar tool and requests access to a network, such as the Internet. A network services provider detects the context bar tool and provides network access to the user. A content and ads service gathers content and advertising and populates a context bar graphic interface that is displayed on the user's device with the content and advertising. Providers of the content and advertising pay for this exposure and thus generate revenue that can be used to offset the cost of providing the network access and other network services.

20 Claims, 9 Drawing Sheets

(56) References Cited

OTHER PUBLICATIONS

The Chinese Office Action mailed Nov. 16, 2011 for Chinese patent application No. 200880017349.9, a counterpart foreign application of U.S. Appl. No. 11/754,105, 7 pages.

The European Office Action mailed Jan. 10, 2012 for European patent application No. 08769304.0, a counterpart foreign application of U.S. Appl. No. 11/754,105, 9 pages.

The European Office Action mailed Aug. 7, 2012 for European patent application No. 08769304.0, a counterpart foreign application of U.S. Appl. No. 11/754,105, 16 pages.

The European Office Action mailed Mar. 4, 2013 for European patent application No. 08769304.0, a counterpart foreign application of U.S. Appl. No. 11/754,105, 22 pages.

* cited by examiner

CONTEXTUALLY AWARE CLIENT APPLICATION

BACKGROUND

Wireless devices proliferate, and with this proliferation comes an accompanying demand for access to wireless networks. While many wireless networks currently exist, the terms on which wireless users may access these networks are often problematic in that wireless users often demand cheap or free access to wireless networks and the Internet. This presents a problem to providers of wireless network services because there are very real costs to setting up and maintaining wireless networks. To recoup these costs, many providers of wireless network services charge an access fee to users and provide limited or no network access to potential users unwilling to pay the access fee. Wireless users that consider these terms of access undesirable may choose not to access these particular networks.

SUMMARY

Techniques and processes for subsidizing network access via content and advertising revenue are described. In one implementation, a user installs a context bar tool on the user's computing device. To access a network (e.g., a wireless network), the user activates the context bar tool and requests access to a network, such as the Internet. A network services provider detects the context bar tool and provides network access to the user. A content and ads service gathers content and advertising and populates a context bar graphic interface that is displayed on the user's device with the content and advertising. Providers of the content and advertising pay for this exposure and thus generate revenue that can be used to offset the cost of providing the network access and other network services.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The described processes and techniques use targeted advertising and content to offset the costs of providing network services. Revenue generated by the advertising and content is shared with network service providers in exchange for providing discounted or free network access to certain network users. To take advantage of the discounted or free network access, a prospective network user runs a context bar tool on the user's wireless device. The context bar tool presents a context bar to the user in the form of a graphical user interface that displays, among other things, advertising and content on the user's wireless device. Advertisers and content providers that gain exposure through the context bar pay for this service and thereby generate revenue that offsets the network services costs. This is not intended to be limiting, however, and content may be displayed on the content bar without additional cost to the content provider.

Exemplary Architecture

Figure 1:
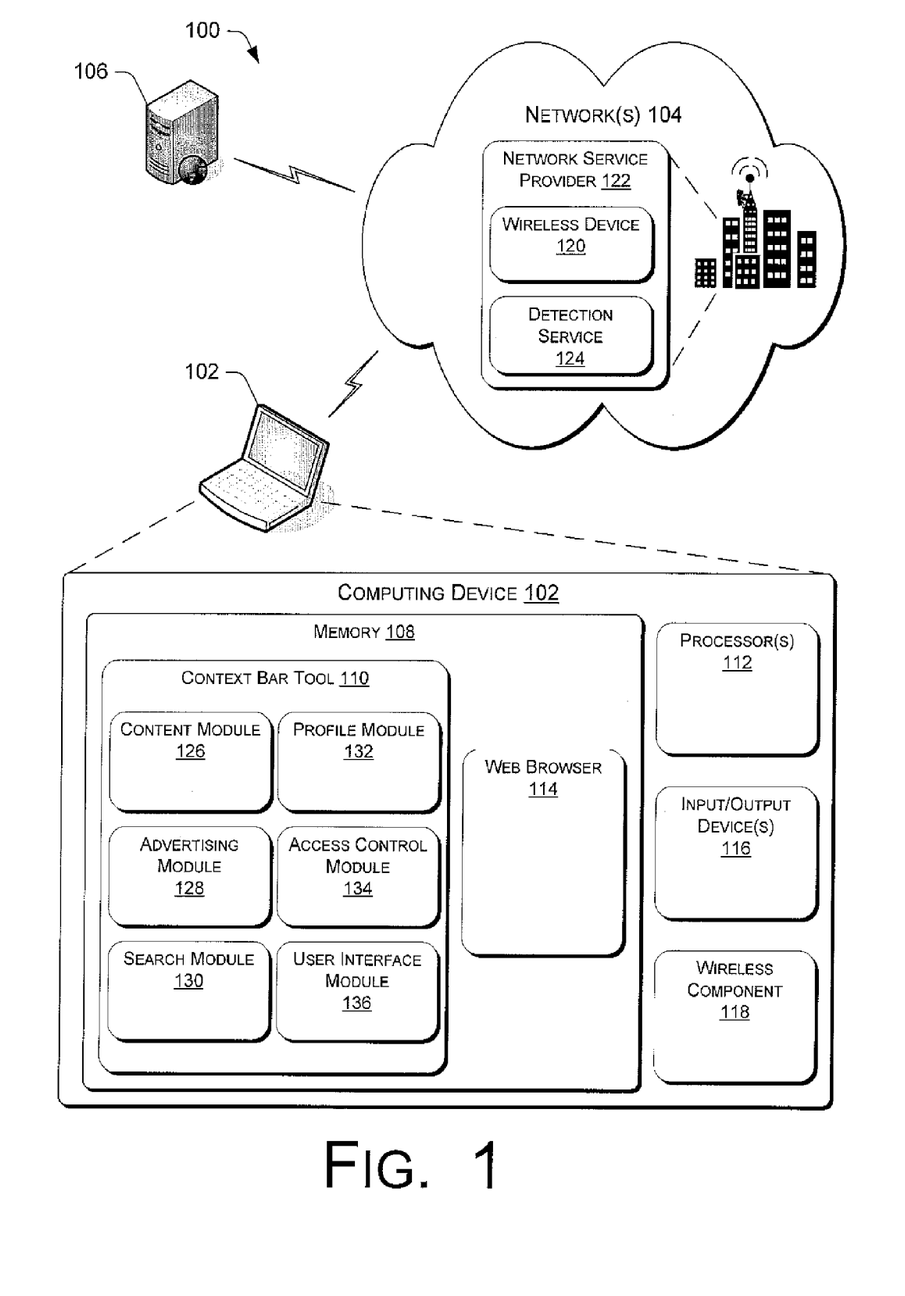
FIG. 1 illustrates an exemplary architecture in which a user can access a network using a context bar tool.

FIG. 1 shows an architecture 100 that can implement the described processes and techniques. Architecture 100 includes a computing device 102, networks 104, and context bar server 106. Computing device 102 is configurable to access an open network over network 104. One example of an open network is the Internet, also known as the "world wide web" or "web". Although illustrated as a notebook or laptop computer, computing device 102 may be implemented as any of a variety of conventional computing devices including, for example, a desktop computer, a workstation, a mainframe computer, a mobile communication device, a PDA, an entertainment device, a set-top box, an Internet appliance, a game console, and so forth. Further to computing device 102 is memory 108. Memory 108 includes computer-readable media in the form of volatile memory, such as Random Access Memory (RAM) and/or non-volatile memory, such as Read Only Memory (ROM) or flash RAM. Memory 108 typically includes data and/or program modules for implementing a context bar tool 110 that are immediately accessible to and/or presently operated on by processor(s) 112. Memory 108 further includes web browser 114. Also included as part of computing device 102 are input/output devices 116 (e.g., keyboard and mouse), and a system bus (not shown) that operatively couples various components including processor(s) 112 to memory 108.

Network(s) 104 may be a wired network, a wireless network, or a combination thereof. Network 104 may further be a collection of individual networks, interconnected with each other and functioning as a single large network (e.g., the Internet or an intranet). Examples of such individual networks include, but are not limited to, Local Area Networks (LANs), Wide Area Networks (WANs), Metropolitan Area Networks (MANs), cellular networks, satellite networks, and cable networks.

In one example, the user of computing device 102 wishes to connect an open network (e.g., the Internet). As part of a connection process, wireless component 118 detects network 104 and sends a connection request to the network. Wireless component 118 is any device capable of enabling computing device 102 to send and/or receive wireless signals. The request is received by wireless device 120 on network service provider 122. Wireless device 120 is a device capable of receiving and transmitting wireless signals, such as a wireless fidelity (hereinafter "WiFi") router, a wireless access point (WAP), or any other device capable of sending and receiving wireless data signals. Network service provider 122 is an entity (e.g., an Internet service provider) that constructs and/or maintains the physical components necessary to administer all or part of network 104.

Wireless device 120 communicates to detection service 124 that a connection request has been received. Detection service 124 queries computing device 102 to determine the subscriber status of computing device 102. In one example, network service provider 122 provides for different levels of subscriber services. Some subscribers pay a subscription fee to be entitled to a certain level of network access (e.g., a certain connection bandwidth or level of open network accessibility). Other subscribers have installed context bar tool 110 on their computing devices, which then entitles them to a certain level of network access.

Context bar tool 110 can be installed on a computing device and serve to enable a user to access a network in exchange for activating (i.e., running) the tool on their device. Context bar tool 110 includes a plurality of components and modules to implement the functionality of the context bar tool and allow contextually relevant content and advertisements to be displayed on a computing device. The terms "module" and/or "component" as used herein generally represents software, firmware, or a combination of software and firmware. The components and modules of context bar tool 110 include:

Content Module 126—this module is configured to receive and store content and other information that a user would consider relevant (e.g., information that is contextually relevant to content that the user is viewing on web browser 114). The content and other information can be received from an external entity such as context bar server 106. The content may include web content such as websites, blogs, and other information of interest to the user. Contextual relevance is based in part on user profile information such as the user's age, geographical location, area of employment, hobbies, and the like. As is discussed below, contextual relevance can also be determined by the types of websites that a user visits and the types of search terms that a user enters during a web search session.

Advertising Module 128—this module is populated with advertisements that are contextually relevant to a viewer's profile and/or to the content of the web page the user is viewing.

Search Module 130—this module allows a user to execute a search with the context bar tool and may also return search results that match a user's profile and/or are contextually relevant to content that the user is viewing. This module also enables the context bar tool to provide search results from a predefined search engine when the user executes a search using any other search engine in their browser.

Profile Module 132—this module is populated with profile data about a user that is accessible to external entities (e.g., context bar server 106). This module also determines the current context of a user, such as physical location, date and time, and the content and/or network location (e.g., the website on a web browser) that is being viewed by the user. Thus, the profile module can monitor a web browser and log the network locations that a user navigates to.

Access Control Module 134—this module communicates with an external detection service (e.g., detection service 124) and updates the detection service as to the status of the context bar tool. This permits the detection service to decide how to broker the computing device's network connection.

User Interface Module 136—this module compiles the information from the other modules (e.g., content from content module 126 and/or ads from advertising module 128) and generates a graphical user interface that contains the information and that can be displayed on the computing device.

In one exemplary implementation, when context bar tool 108 is running on computing device 102, a context bar interface is displayed on the computing device. The context bar interface displays contextually relevant content and advertising that are compiled by the various components of the context bar tool discussed above. Typically, the content and advertising are received from a content and ads service maintained by or accessible to context bar server 106. The determination and accumulation of content and advertising are discussed in more detail below.

Detection Service

Figure 2:
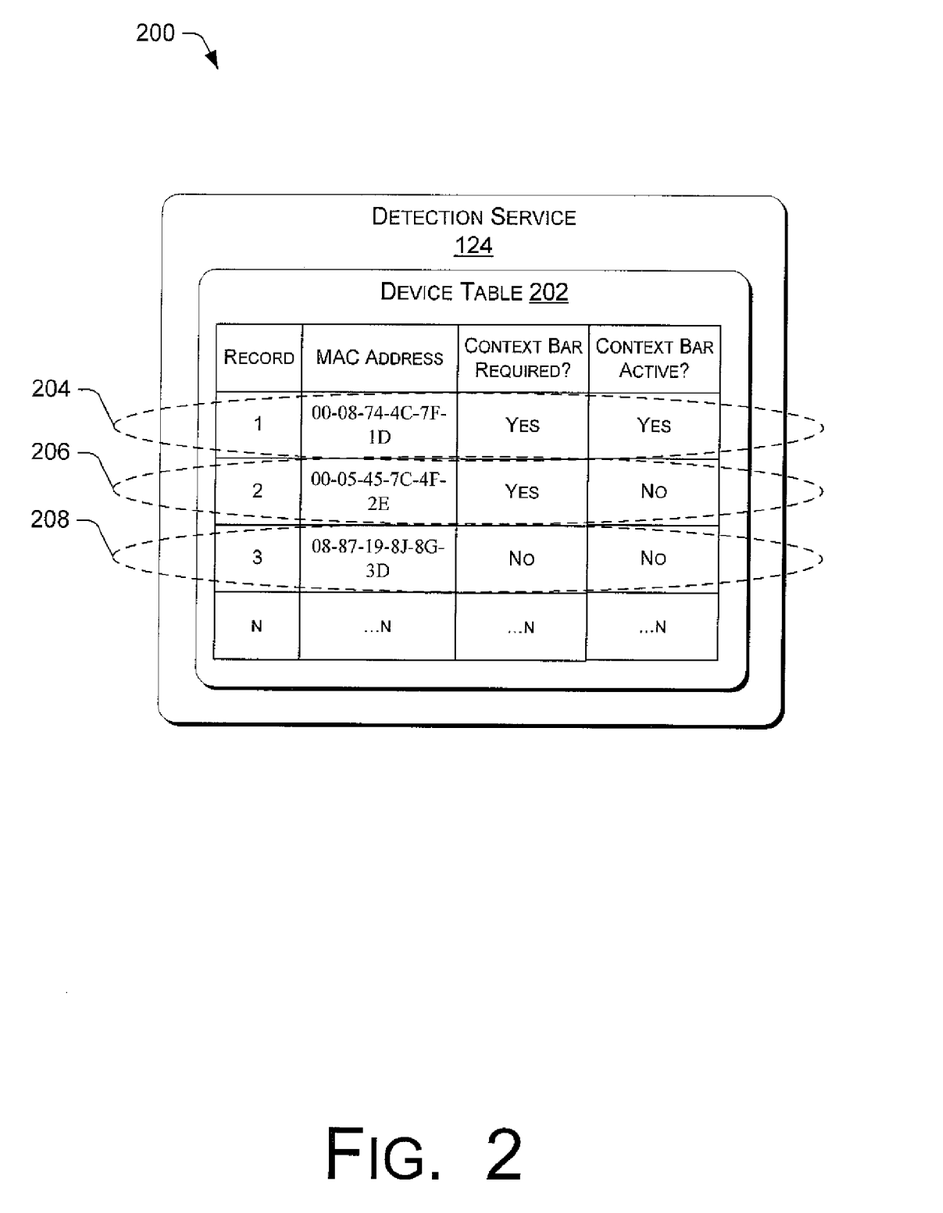
FIG. 2 illustrates an exemplary detection service module that allows a network service provider to broker a network connection for a user.

FIG. 2 illustrates at 200 various components of an exemplary detection service 124. Detection service 124 may be implemented on any suitable computing device, such as a web server or a mainframe computer, and is communicatively connected to the other components of network service provider 122.

Detection service 124 includes device table 202, which stores data about various devices. In one exemplary implementation, the user of a computing device (e.g., computing device 102) wishes to connect to the Internet. The user's device detects a wireless network within range and sends a connection request to the wireless network service provider. As part of the wireless network service provider, detection service 124 retrieves a device identifier from the user's device. The device identifier may be included in a data packet that is part of the connection request or may be obtained as part of a handshaking process. Although illustrated in FIG. 2 as a media access control (MAC) address, the device identifier can be any suitable identifier capable of distinguishing different devices.

Detection service 124 then searches device table 202 for a record that corresponds to the user's device. In one example, detection service 124 locates the device's MAC address stored as device record 204 ("Record 1") of device table 202 (i.e., the device's MAC address is 00-08-74-4C-7F-1D). Detection service 124 then determines if the user's device requires the context bar tool in order to access the Internet. This is indicated as the "Context Bar Required?" field in device table 202. The table indicates for Record 1 that the context bar tool is required for this particular device. Detection service 124 then determines if the context bar tool is active (i.e., running) on the device by attempting to communicate with access control module 134 on context bar tool 110. If the context bar tool is active on the device, access control module 134 will respond as such to detection service 124. This is indicated as the "Context Bar Active?" field in device table 202. The table indicates for Record 1 that the context bar tool is currently active. Thus, in this example, the device would be granted access to the Internet since the device is running the required context bar tool.

In another example, detection service 124 determines that a device identified by device record 206 ("Record 2") of device table 202 requires the context bar tool in order to access the Internet. However, device table 202 indicates that the context bar tool is not active on the device, and thus the network service provider might grant limited access to the Internet, enforce limits on network access, or grant no network and/or Internet access at all. Other network access options might be available to this device, as are discussed below.

In yet another example, detection service 124 determines that a device identified by device record 208 ("Record 3") of device table 202 does not require the context bar tool in order to access the Internet. In this example, the device would be give access to the Internet without being required to run the context bar tool. Although device table 202 is shown here with three device records, this is for purposes of example only, and a device table may any number of device records.

Content Server

Figure 3:
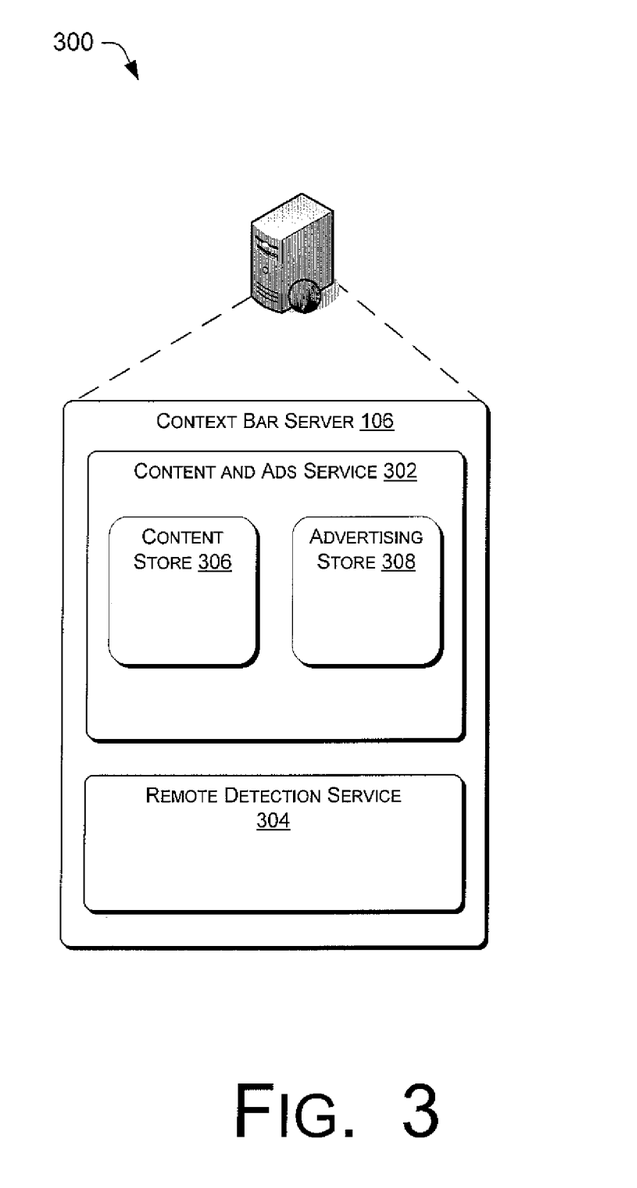
FIG. 3 illustrates an exemplary context server that can provide content and advertising for a context bar interface that is displayed on a user's device.

FIG. 3 illustrates at 300 various components of an exemplary context bar server 106. Context bar server 106 may be a web server, a server farm, a mainframe computer, a data center, or any other computing resource capable of sending, receiving and processing data. Context bar server 106 includes, but is not limited to, content and ads service 302 and remote detection service 304. For purposes of discussion, content bar server 106 is discussed with reference to architecture 100.

Content and ads service 302 includes content store 306 and advertising store 308. Content store 306 is a collection of content that is used to populate a context bar tool interface. Generally stated, content refers to web pages and their associated elements. Content also refers to text, graphics, clip art, photos, videos, podcasts, hyperlinks, code that can be returned in response to hypertext transport protocol (HTTP) requests. Content may consist of news, journals, web logs (blogs), online periodicals, and the like. Advertising store 308 is a collection of advertising that is used to populate a context bar interface. Advertising refers to messages paid for by an advertiser that promote a certain product and/or service. Advertising may take the form of graphics, videos, audio, and the like that can be executed on a computing device. Alternatively and/or additionally, content and ads service 302 can access a remote resource and collect content and advertising from the remote resource. While content and ads service 302 is illustrated here as an integrated service, other implementations may utilize separate services for content and ads. Thus, there may be one or more content services and one or more separate ads services from which content and ads can be gathered to populate a context bar.

In one implementation, a context bar tool that is active on a user's device generates profile data and submits the profile data to context server 106. The profile data may be generated by profile module 132 on context bar tool 110. Profile data will be discussed in more detail below, but generally refers to information about a user and the user's online experience. Content and ads service 302 captures the profile data and identifies context data that is contextually related to the profile data. Context data includes content from content store 306 and advertising from advertising store 308 that correspond to the profile data. The identified content and advertising are then transmitted to the user's device and displayed or otherwise executed in a graphical user interface associated with the context bar tool.

Content and ads service 302 can track content and ads that are returned to a context bar tool. Thus, content and ads service 302 can quantify how often a particular piece of content or advertising has been returned to a context bar and displayed. The content and ads service can also track click-throughs that occur on content and advertising that are displayed on a particular context bar. Click-throughs occur when a user clicks (e.g., with a mouse) on content or an ad to view more information from the content provider or advertiser. This allows the content and ads service to quantify content and ad exposure and to collect fees from content and ad providers based on the exposure.

To ensure that a context bar tool is active on a device that requires the tool for network access, context bar server 106 can implement remote detection service 304 to communicate with or otherwise access the device and determine if the context bar tool is active on the device. In one example, remote detection service sends a connection query packet to access control module 134. If the context bar tool is active on the device, the access control module will send a reply packet indicating that the context bar tool is active. Otherwise, if access control module 134 fails to reply or sends a reply packet indicating that the context bar tool is not active, context bar server 106 can notify network service provider 122 of this condition. The network service provider can then limit or deny network access to the device, if appropriate.

Context Bar Interface

Figure 4:
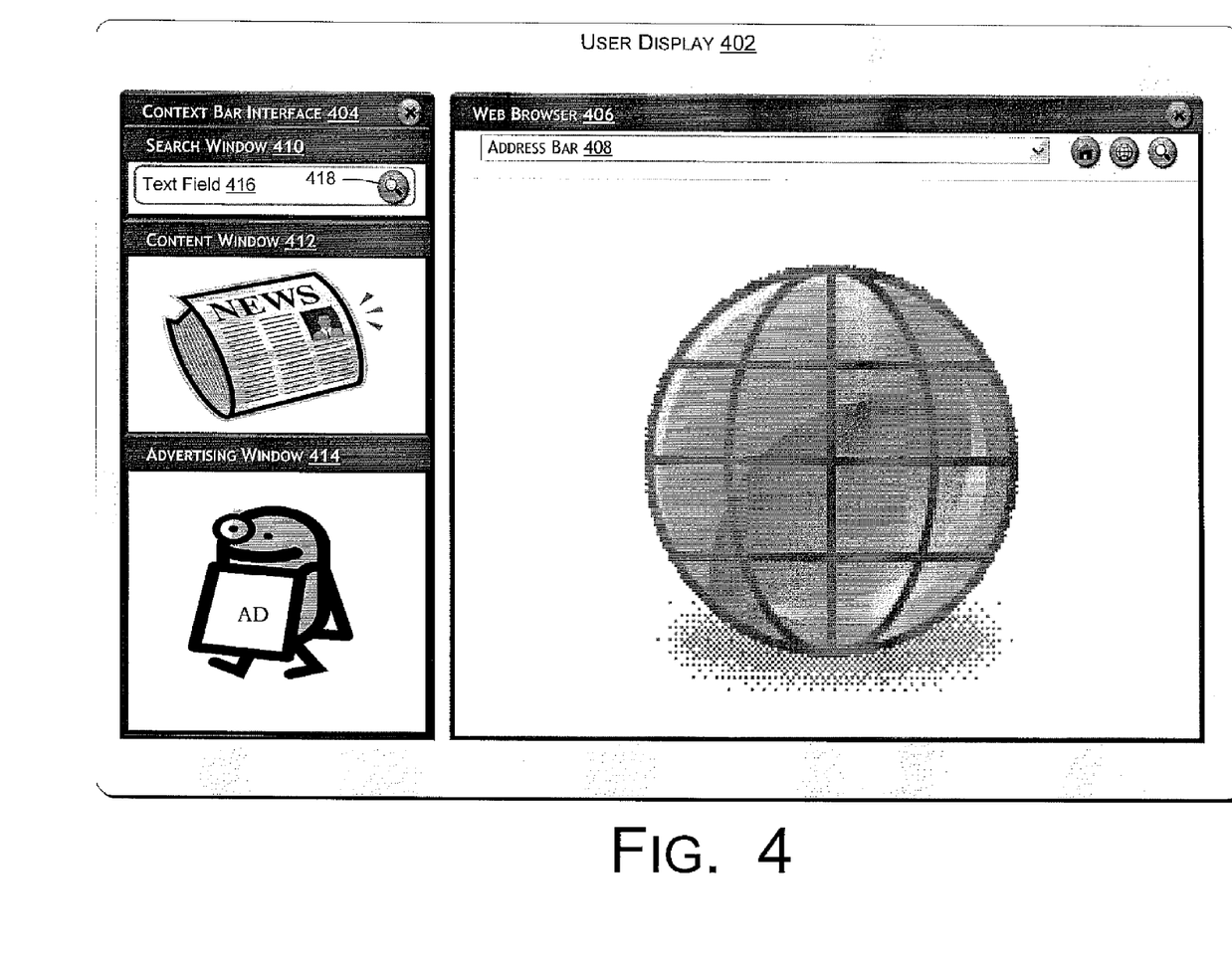
FIG. 4 illustrates an exemplary user device display with an exemplary context bar interface.

FIG. 4 illustrates user display 402 that includes an exemplary context bar interface 404 and a web browser 406. User display 402 is a visual display may be implemented on any suitable display device, such as a computer display monitor.

Web browser 406 is an interface associated with a web browser application that allows a user to navigate a network such as the Internet. Web browser 406 includes address bar 408, which allows a user to enter a network address (e.g., a uniform resource locator, or "URL") that causes the web browser to navigate to a network location that corresponds to the network address. In one example, a user enters a URL and the web browser navigates to a website that corresponds to the URL.

Context bar interface 404 may be displayed on user display 402 adjacent to web browser 406, or alternatively may be displayed as part of the web browser. Although shown here as a single integrated interface display, context bar interface 404 can also consist of several disconnected display windows displayed on a user's display. Exemplary context bar interface 404 includes search window 410, content window 412, and advertising window 414. This example is not intended to be limiting, however, and other context bar interfaces may contain different types and arrangements of displays and display windows and other context bar interfaces may or may not contain content and/or ads.

Search window 410 includes a text field 416 that allows a user to enter search terms and conduct a search (e.g., a web search) for content and other information that matches the search terms. In one implementation, a user enters one or more search terms in text field 416 and presses search button 418. Search results based on the search terms may be gathered and displayed to the user in context bar interface 404 (e.g., in content window 412). Additionally and/or alternatively, the search results may be displayed in web browser 406.

Content window 412 is used by the context bar tool to display content that is retrieved from context bar server 106. The content may include graphics, video and audio, and may also include links (e.g., hyperlinks) to websites at which content may be viewed. Advertising window 414 displays ads that are retrieved from context bar server 106. Content window 412 and advertising window 414 not only allow users to view content and advertising, but additionally allow users to select content and advertising of interest (e.g., by mouse-clicking on the content or advertising) and thus be directed to further information about the content or advertising.

To prevent a user from obscuring context bar interface 404 (e.g., by covering it with the web browser or other display window), the context bar interface can be configured such that it must always remain in the foreground when it is active (i.e., the context bar interface is "always on top"). Thus, a user can move the context bar interface around on the user's desktop, but the context bar interface cannot be hidden behind other visual interfaces or graphics. This ensures that the content providers and advertisers will gain the exposure that they pay for. In one example, the context bar interface remains active (i.e., displayed on the device) when the internet browser application is active. This allows the network service provider to control network access based on whether or not the context bar interface is displayed to the user. If the interface is not displayed on the device, the detection service would detect this and the network service provider can adjust the device's network access (e.g., by denying the device access to the network or by enforcing limits on the device's network access).

Exemplary Processes

Figure 5:
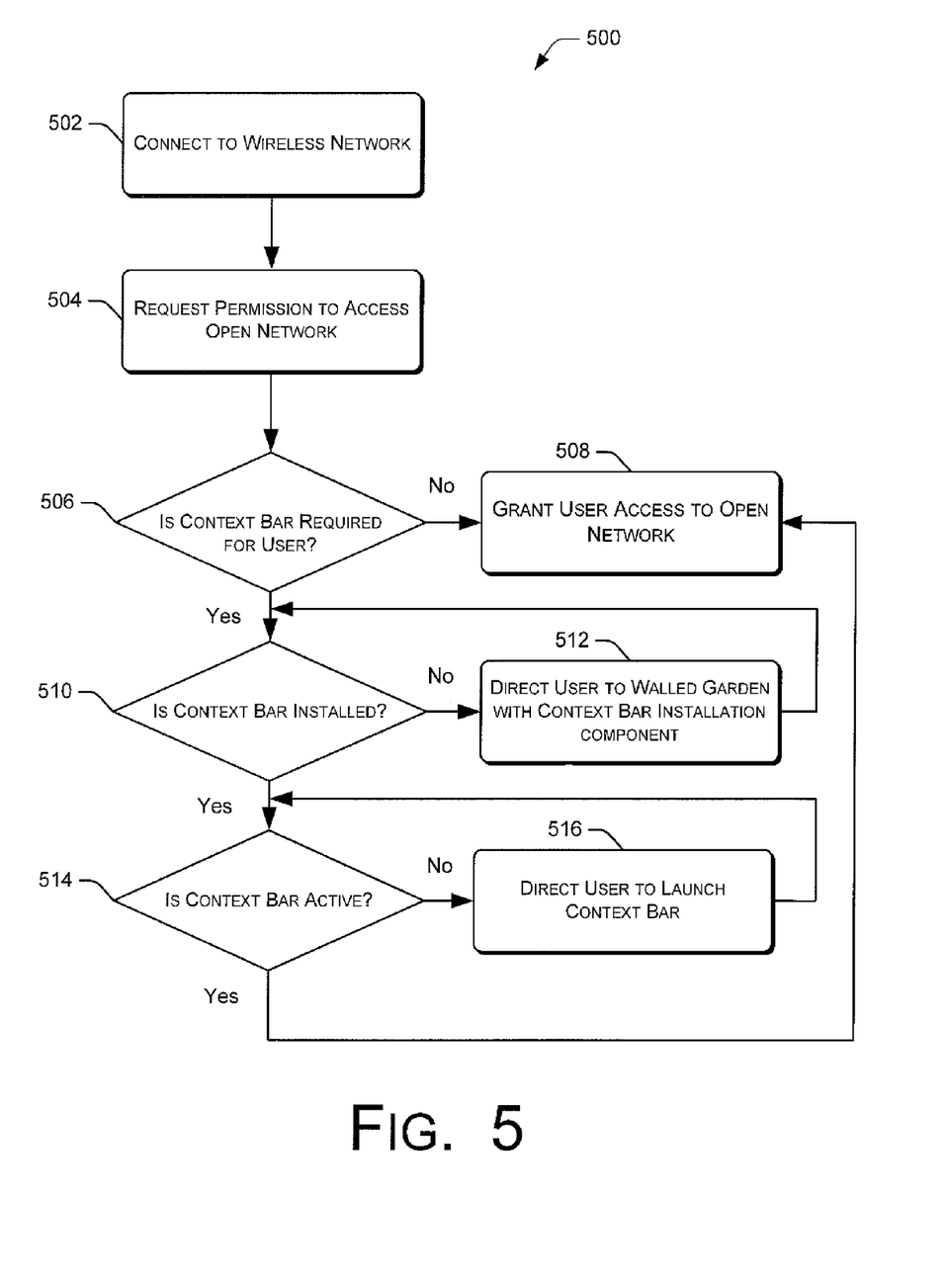
FIG. 5 is a flow diagram of an exemplary process for brokering a network connection for a user.

Exemplary processes for implementing a context bar tool are described in this section with additional reference to FIGS. 1-4. FIG. 5 provides an overview of controlling network access based on context bar tool activity, while FIGS. 6-9 offer more detailed implementations of context bar functionality. The exemplary processes may be described in the general context of computer executable instructions and are illustrated as collections of blocks in logical flow graphs, which represent sequences of operations that can be implemented in hardware, software, or a combination thereof. Generally, computer executable instructions can include routines, programs, objects, components, data structures, procedures, modules, functions, and the like that perform particular functions or implement particular abstract data types. The processes may also be practiced in a distributed computing environment where functions are performed by remote processing devices that are linked through a communications network. In a distributed computing environment, computer executable instructions may be located in both local and remote computer storage media, including memory storage devices.

FIG. 5 illustrates an exemplary process 500 for implementing a context bar tool as part of a network connection negotiation mechanism. At 502, a user's device connects to a wireless network, such as a wireless metropolitan area network. This is not intended to be limiting, however, and any suitable network may be utilized—wireless, wired, or otherwise. At 504, the device requests permission to access an open network (e.g., the Internet) via the wireless network.

At 506, the network service provider, such as a metropolitan area network wireless Internet service provider, determines if the content bar tool is required for the user to access the open network. If the context bar tool is not required for the particular user, the user is granted access to the open network at 508. If the context bar tool is required for the user, it is determined at 510 if the context bar tool is installed. If the context bar tool is not installed, at 512 the user is directed to a "walled garden" that enables the user to install the context bar tool on his or her device. A walled garden is a network browsing environment that controls the information and network locations that a user may access. In some examples, the walled garden is a website administered by the network service provider and/or the context bar server that contains specific content and advertising and provides the user with access to a limited number of websites, provides limited network access to the user, and/or prevents the user from navigating outside the walled garden. The walled garden includes a hyperlink or other component that, when selected, allows the user to download and install the context bar tool on the user's device.

The process then returns to 510 and determines if the user has installed the context bar tool. If the context bar tool is installed on the user's device, then it is determined at 514 if the context bar is active (i.e., running on the device). If the context bar is not active, then at 516 the user is directed to launch the context bar. In one example, the user is directed to a walled garden that prompts the user to launch the context bar on the device. The walled garden contains a hyperlink or other component that, when selected, allows a user to launch the context bar tool on the user's device. Alternatively, if the context bar is installed but is not active, the context bar may automatically launch on the user's device. The process then returns to 514 and determines if the context bar tool is active on the user's device. If the context bar tool is active, the user is granted open network access at 508. If the user chooses not to activate the context bar tool, the network may restrict the user's network access to the walled garden. In one example, if the context bar is not active on the device, the network service provider denies the device permission to access an open network. The process may continue to cycle through acts 514 and 516, and thus permit the user to access the open network should the user device at a subsequent time to activate the context bar tool. The order in which these acts are presented are for purposes of example only, and the acts may be performed in any suitable order.

Figure 6:
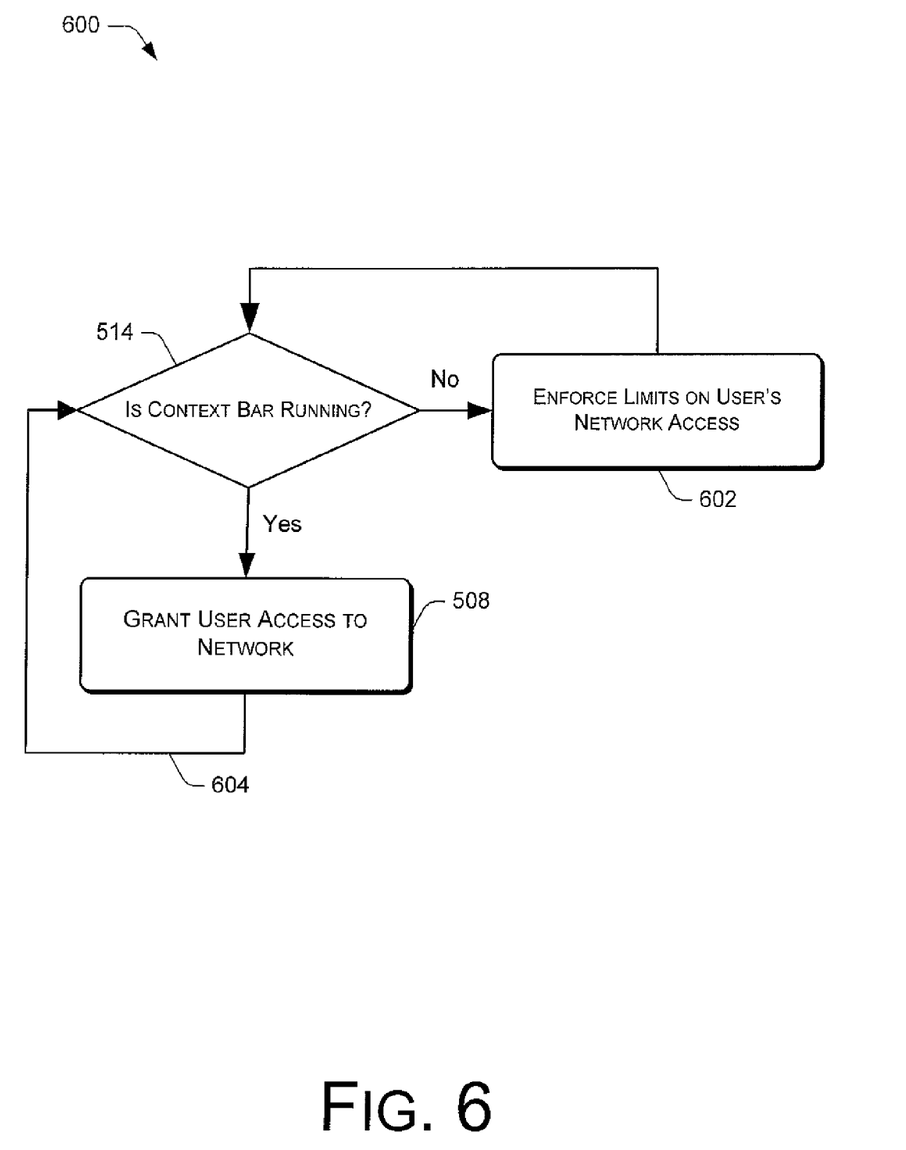
FIG. 6 is a flow diagram of an exemplary process for ensuring that a context bar tool remains active on a user's device.

FIG. 6 illustrates at 600 a further elaboration on exemplary process 500. At 514, is determined if the context bar tool is active on the user's device. If the context bar tool is not active on the device, at 602 limits are enforced on the user's network access. As discussed above, this may involve directing the user's device to a walled garden that includes limited content and a context bar launch component. Additionally and/or alternatively, enforcing limits on the user's network access may include limiting the quality of service provided to the user by the network service provider. Quality of service includes such parameters as the data transmission rate (bandwidth) between the user's device and the wireless network, and may further include the security level of the network connection. Thus, if a user is not running the context bar tool in the user's device, the network service provider can provide to the user's device a lower bandwidth connection to the Internet and/or less robust security features than a user would receive if the user was running the context bar tool on the user's device.

If the context bar tool is active on the user's device, at 508 the user is granted access to or is granted permission to access the Internet or other open network. As illustrated by line 604, the process periodically polls the user's device during a network connection session to ensure that the context bar tool remains active on the user's device. For example, detection service 124 may send a connection query packet to access control module 134 every 5 seconds (or at any other suitable time interval). If the context bar tool is active on the user's device, access control module 134 will return a reply packet to detection service 124 indicating that the context bar tool is active. If detection service 124 fails to receive a reply over one or more subsequent polling attempts, or receives a reply packet that indicates that the context bar tool is not active on the user's device, the process may return to act 602. This can include directing the user's device to a walled garden and/or enforcing limits on the user's access to the Internet. Thus, the process ensures that the context bar remains displayed on the user's device during a network connection session.

Context-Based Content and Advertising

Figure 7:
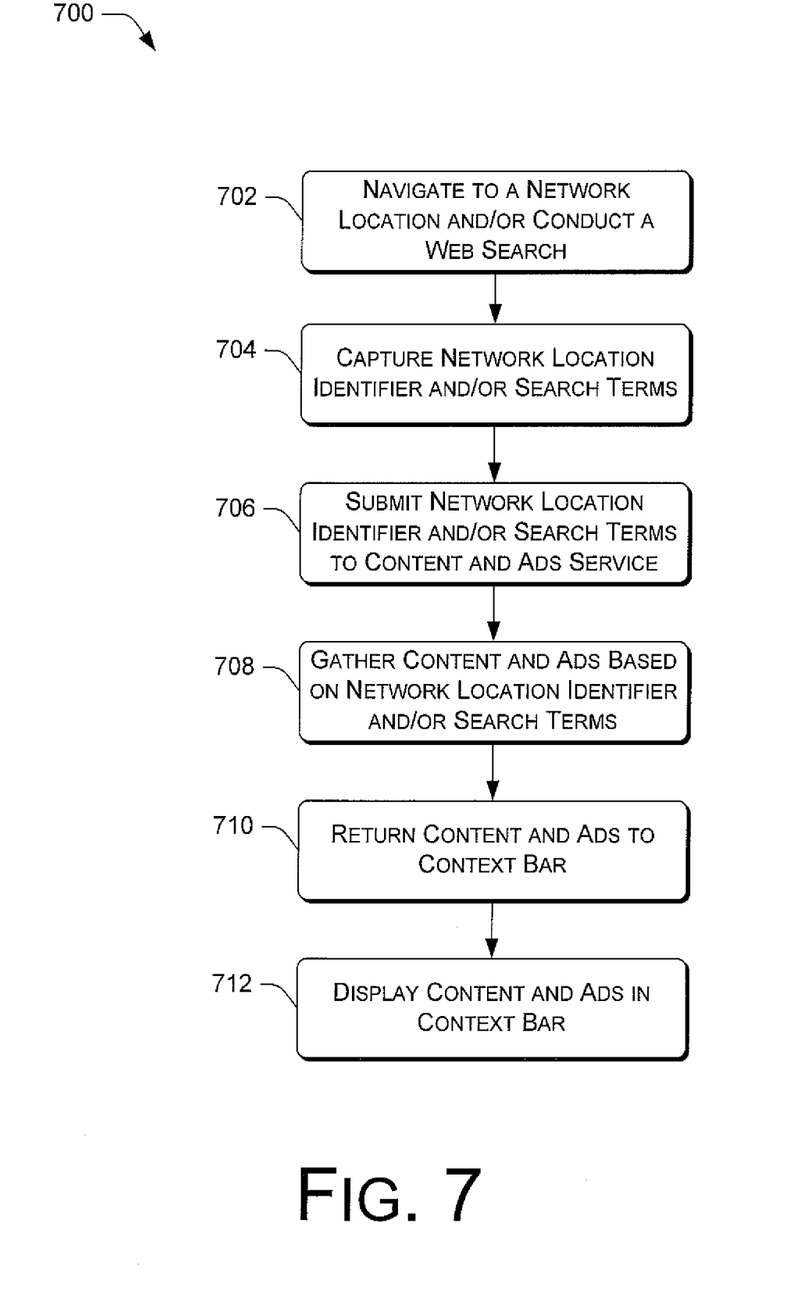
FIG. 7 is a flow diagram of an exemplary process for populating a context bar interface with contextually related content and advertising.

FIG. 7 illustrates at 700 an exemplary process for gathering and displaying context-based content and advertising on a context bar interface. At 702, a user navigates to a network location and/or conducts a web search based on a set of search terms. In one example, this includes typing or selecting a URL in a web browser and navigating the web browser to a website that corresponds to the URL. This may also include submitting one or more search terms into a search engine to conduct a web search based on the search terms. At 704, a network location identifier (e.g., a URL) and/or the search term(s) are captured. Thus, the user's navigation behavior in terms of a network location identifier and/or search terms is observed and logged. This may be implemented by a profile module that is part of the context bar tool. The profile module monitors the web browser or other network access interface and captures the user's navigation behavior.

At 706, the network location identifier and/or search terms are submitted to the content and ads service. At 708, content and ads that are contextually related to the network identifier and/or search terms are gathered by the content and ads service. Contextual relationships may be determined by any suitable method. In one method, the content and ads service maintains a database of URLs and websites, and associates certain content and ads with the URLs and websites. When a URL or website is submitted to the content and ads service by a context bar tool, the URL or other website identifier is used to search the database for content and ads that correspond (i.e., are contextually related) to the URL or website. Thus, if a user navigates to a sports-related website or conducts a web search with sports-related terms, the content and ads service can correlate the URL or search terms with sports-related content and ads. This correlation may be based on keywords harvested from content and advertising, such as sports-related terms and the like. Thus, in one implementation, the contextual relationships are determined by locating content and advertising that pertain to the same or similar subject matter as the network location and/or search terms (e.g., sports, cooking, politics, and the like). Contextual relationships are often determined by using machine learning techniques implemented by a system that 'reads' a web page to divine the "main ideas" of the page. The "main ideas" are determined by examining the words on the page to look for a number of instances of a particular word or phrase, the proximity of words to each other (including modifiers such as tense and negation), and words that have defined relationships to other words that the system has stored either with the assistance of programmers or through past examinations. There are other methods for determining context as well; and those presented above are simply examples.

At 710, the gathered content and ads are returned to the context bar tool. At 712, a context bar interface is generated and displayed on the user's device (if one is not already displayed) and the content and ads are displayed on the context bar interface.

Figure 8:
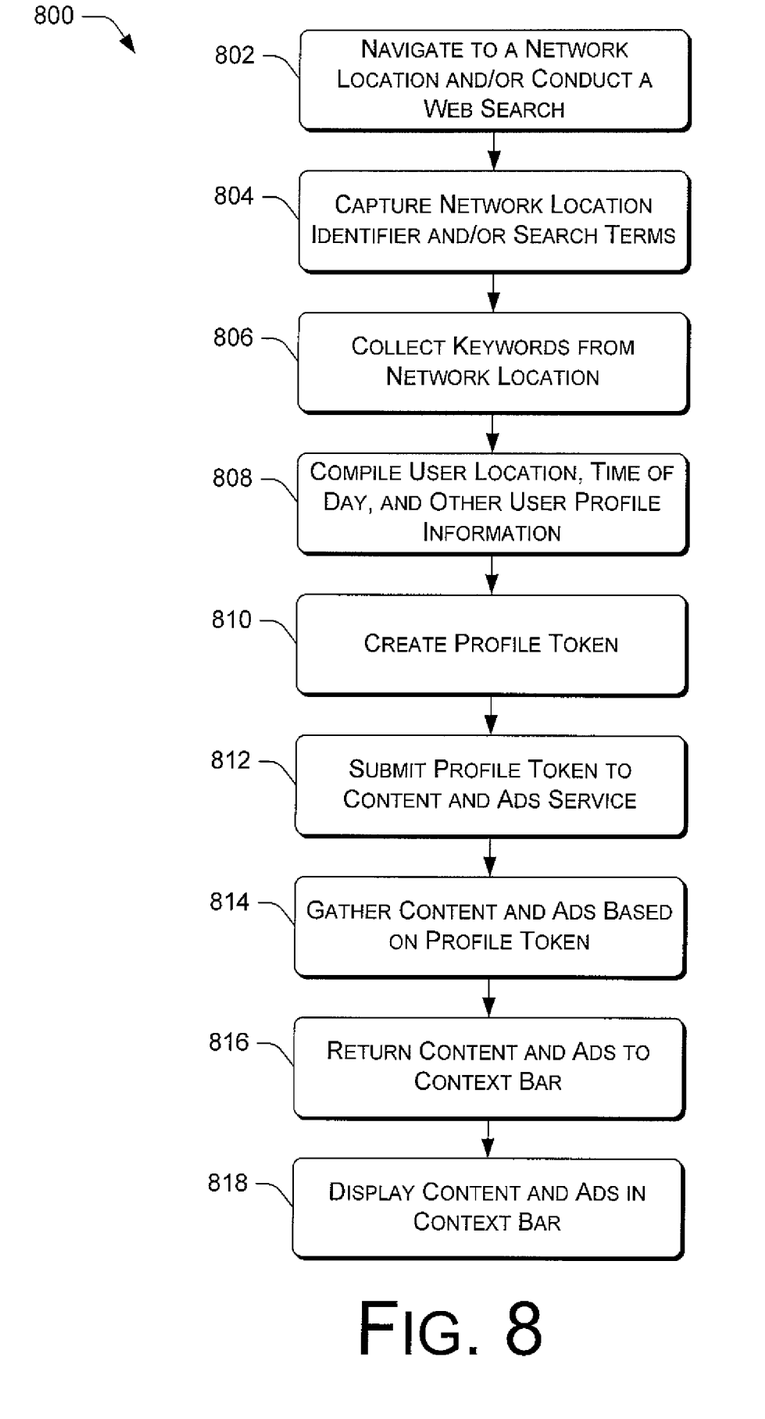
FIG. 8 is a flow diagram of an exemplary process for creating a user profile token and using the user profile token to gather contextually related content and advertising.

FIG. 8 illustrates at 800 an exemplary process for gathering and displaying context-based content and advertising using a profile token. At 802, a user navigates to a network location and/or conducts a web search based on a set of search terms. At 804, a network location identifier (e.g., a URL) and/or the search term(s) are captured. At 806, one or more keywords are harvested from the network location using any suitable technique or protocol for keyword determination. At 808, user profile information is compiled. The user profile information includes the user's geographical location, the current time of day, and any other relevant user profile information.

At 810, a profile token is created using user profile data such as the network location identifier, the search terms, the harvested keywords, the user's geographical location and the time of day. The token is a data structure that contains this information in a form that can be read by the content and ads service. In one implementation, the token is created by making a hash of the above-mentioned information and storing the hash as a profile token. The user profile token can be anonymous to prevent sensitive user identification data from being intercepted by entities and used contrary to the user's wishes. For example, a spammer that intercepts an anonymous user profile token would be unable to trace the token and its information back to the user.

At 812, the user profile token is submitted to the content and ads service. If the token contains hashed data, the content and ads service is configured to interpret the hashed data and generate context information based on the hashed data. At 814, the content and ads service locates and gathers content and ads based on the information gleaned from the user profile token. At 816 the content and ads are returned to the context bar tool and at 818 the content and ads are displayed on the context bar interface.

Figure 9:
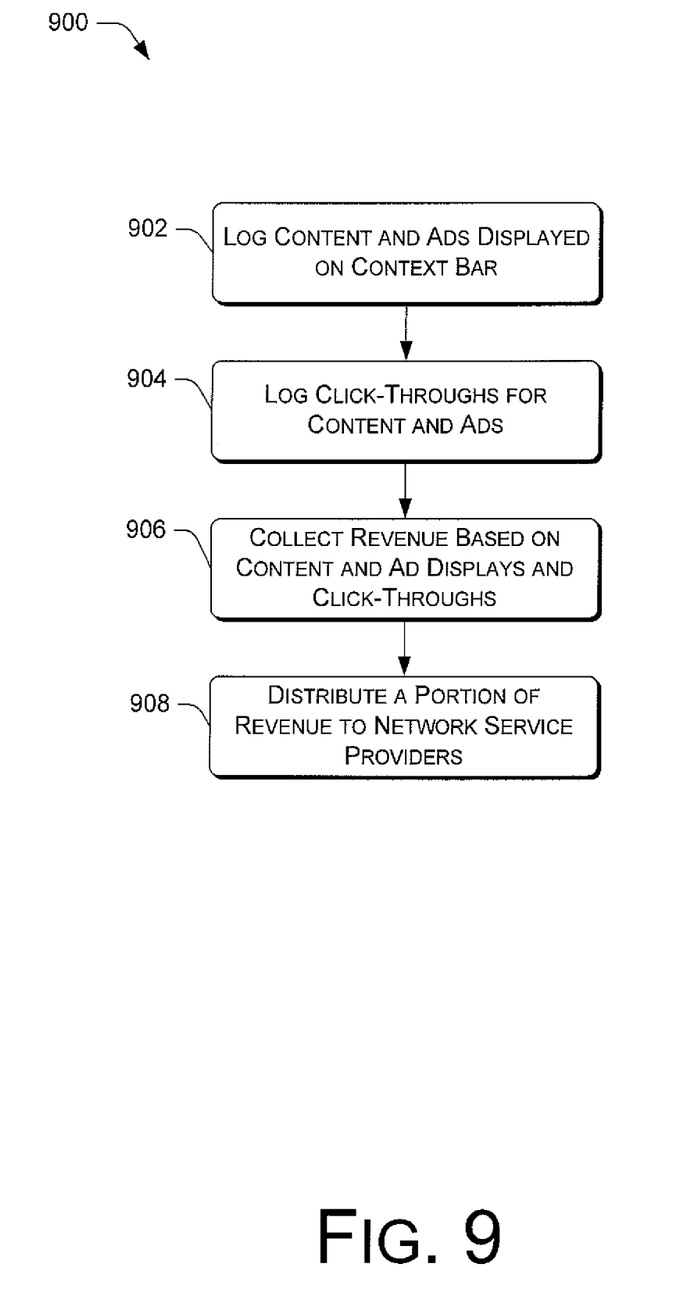
FIG. 9 is a flow diagram of an exemplary process for collecting revenue based on content and advertising exposure.

FIG. 9 illustrates at 900 an exemplary process for quantifying content and ad exposure and generating revenue based on the exposure. At 902, the content and ads that are displayed on a context bar interface are logged. In one implementation, the content and ads service tracks the number of times that it returns certain content and ads to context bar tools and logs these events as content and ad exposures. At 904, the click-throughs for particular content and ads are logged. At 906, revenue is collected in the form of fees paid by the content and ad providers based on the total content and ads exposure (e.g., context bar displays and click-throughs). At 908, a portion or all of the revenue is distributed to network service providers that utilize the context bar tool to control access to their networks. The portion of the revenue distributed to a particular network service provider can be dependent upon the number of users over a specific time interval (e.g., one month) that access the providers network(s) via the context bar functionality, and/or the total data transfer via the context bar functionality over a given time interval (e.g., 1000 gigabytes of data transferred over one month by users accessing the network via the context bar tool).

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method performed at a computing device, comprising:
receiving a request from a device for permission to access a network, wherein the access to the network is through a context bar application on the device;
determining, each time the request is received, if the context bar application is running on the device, the context bar application being configured to display data that is contextually related to a network navigation behavior of a user of the device;
if the context bar application is running on the device, granting the device permission to access the network; and
in response to determining that the context bar application is not installed on the device, directing the device to a network browsing environment that provides limited network access including access to a website that enables the user to download and install the context bar application on the device.

2. A method as recited in claim 1, wherein the context bar tool application comprises an access control module to inform a network service provider that the context bar application is running on the device.

3. A method as recited in claim 1, wherein the context bar application is configured to:
  capture an identifier identifying a network location to which the device navigates; and
  based at least in part on the identifier, display on the device data that is contextually related to the network location.

4. A method as recited in claim 1, further comprising:
  creating a user profile token that includes information about the user of the device;
  gathering content using the user profile token; and
  displaying the content on the device using the context bar application.

5. A method as recited in claim 1, further comprising:
  if the context bar application is not running on the device, determining if the context bar application is installed on the device.

6. A method as recited in claim 1, further comprising:
  launching the context bar application after the context bar application is installed.

7. A system comprising:
  one or more computer-readable storage media excluding propagating signals;
  one or more processors; and
  a detection service stored on the one or more computer-readable storage media, the detection service comprised of instructions executable by the one or more processors to:
    determine, when the computing device initiates access to a network, whether a context bar application is installed on the computing device;
    in response to determining that the context bar application is installed, detect activities initiated by a user interacting with the context bar application, the context bar application to log one or more network locations to which the computing device navigates and to receive context data related to the one or more network locations;
    control network access by the computing device based at least in part on the activities when the context bar application is installed; and
    in response to determining that the context bar application is not installed, directing the computing device to a network browsing environment that provides access to a limited number of websites including a website enables the user to download and install the context bar application on the computing device.

8. A system as recited in claim 7, wherein the context bar application comprises a user interface module to display the context data to a user of the device.

9. A system as recited in claim 7, wherein the context data comprises one or more of content and advertising.

10. A system as recited in claim 7, wherein the context application comprises an access control module to notify the detection service of the context bar application activity.

11. A system as recited in claim 7, further comprising a network service provider configured to provide network access to the device based at least in part on a determination of context bar application activity made by the detection service.

12. One or more computer-readable storage memory, the computer readable storage memory storing computer-executable instructions that when executed, cause one or more processors to perform operations comprising:
  receiving a request, at a computing device, to connect to a wireless network;
  determining, when the request is received, a level of network access associated with the computing device;
  in response to determining that the level of network access is associated with a presence of a context bar application, determining whether the context bar application is installed on the computing device;
  in response to determining that the context bar application is not installed on the computing device, enforcing limits on accessing the wireless network including limiting a quality of service provided to the computing device; and
  directing the computing device to one or more websites that enable the context bar application to be downloaded to the computing device.

13. The one or more computer-readable storage memory of claim 12, wherein limiting the quality of service includes limiting a data transmission rate between the computing device and the wireless network.

14. The one or more computer-readable storage memory of claim 12, wherein limiting the quality of service includes limiting a security level of a network connection between the computing device and the wireless network.

15. The one or more computer-readable storage memory of claim 12, wherein limiting the quality of service includes providing a lower bandwidth connection between the computing device and the wireless network.

16. The one or more computer-readable storage memory of claim 12, wherein directing the computing device to one or more websites comprises directing the computing device to a walled garden that contains specific content and advertising and prevents the user from navigating outside the walled garden until a determination is made that the context bar application is installed on the computing device.

17. The one or more computer-readable storage memory of claim 16, wherein the walled garden includes a hyperlink to enable the context bar application to be downloaded and installed on the computing device.

18. The one or more computer-readable storage media memory of claim 12, further comprising:
  in response to determining that the context bar application is installed on the computing device, determining whether the context bar application is active on the computing device;
  in response to determining that the context bar application is active on the computing device, providing the level of network access associated with the presence of the context bar application to the computing device; and
  in response to determining that the context bar application is inactive on the computing device, directing a user of the computing device to launch the context bar application.

19. The one or more computer-readable storage memory of claim 12, further comprising:
  creating a profile token using user profile data for a user of the computing device, the user profile data including a network location identifier, one or more search terms, harvested keywords, a geographical location of the computing device, and a time of day; and
  providing the profile token to a service that provides content and ads to the context bar application.

20. The one or more computer-readable storage memory of claim 12, further comprising:
  in response to determining that the context bar application is active on the computing device, displaying content and advertising on the context bar application; and
  tracking click-throughs that occur for the content and the advertising that is displayed on the context bar application.

* * * * *